(12) United States Patent
Ahn et al.

(10) Patent No.: US 11,681,208 B2
(45) Date of Patent: Jun. 20, 2023

(54) PROJECTOR

(71) Applicant: LG ELECTRONICS INC., Seoul (KR)

(72) Inventors: Jaehoon Ahn, Seoul (KR); Kiso Bok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 17/309,850

(22) PCT Filed: Oct. 30, 2019

(86) PCT No.: PCT/KR2019/014440
§ 371 (c)(1),
(2) Date: Jun. 23, 2021

(87) PCT Pub. No.: WO2020/149499
PCT Pub. Date: Jul. 23, 2020

(65) Prior Publication Data
US 2022/0026786 A1    Jan. 27, 2022

(30) Foreign Application Priority Data

Jan. 16, 2019    (KR) .................. 10-2019-0005686

(51) Int. Cl.
*G03B 21/14*    (2006.01)
*G02B 7/02*    (2021.01)

(52) U.S. Cl.
CPC .................. *G03B 21/142* (2013.01)

(58) Field of Classification Search
CPC .................. G03B 21/142; G02B 7/023
See application file for complete search history.

(56) References Cited

U.S. PATENT DOCUMENTS

2006/0092384 A1* 5/2006 Kuroda ............ G03B 21/145
353/69
2018/0314138 A1 11/2018 Inui et al.

FOREIGN PATENT DOCUMENTS

JP        2010256388      11/2010
KR    1020020063676       8/2002
(Continued)

OTHER PUBLICATIONS

PCT International Application No. PCT/KR2019/014440, International Search Report dated Feb. 21, 2020, 9 pages.

*Primary Examiner* — Ryan D Howard
(74) *Attorney, Agent, or Firm* — Lee Hong Degerman Kang Waimey

(57) ABSTRACT

The present invention relates to a projector comprising: a housing; a projection part for projecting an image; a projection lens module for expanding and projecting, on an outside screen, the image projected from the projection part; and a position adjustment part for controlling the positions of a first direction and a second direction of the projection lens module. The position adjustment part comprises: a first fixed bracket fixed to the housing and comprising an opening part through which a projection lens passes; a first moving bracket positioned on one surface of the fixed bracket and enclosing the circumference of the projection lens; a second moving bracket positioned on one surface of the first moving bracket and enclosing the circumference of the projection lens; a screw coupled to the first moving bracket in the first direction; a first dial exposed to the outer side by being coupled to the end part of the screw; a second dial positioned in a ring-shape on the circumference of the first dial; and a gear module for moving the second moving bracket in the second direction when the second dial rotates.

15 Claims, 14 Drawing Sheets

(56) References Cited

FOREIGN PATENT DOCUMENTS

| KR | 1020050051365 | 6/2005 |
|----|---------------|--------|
| KR | 1020100115924 | 10/2010 |

* cited by examiner (a)

(b)

(a)

(b)

(a)

(b)

(a)

(b)

(a)

(b)

(a)

(b)

PROJECTOR

CROSS-REFERENCE TO RELATED APPLICATIONS

This application is the National Stage filing under 35 U.S.C. 371 of International Application No. PCT/KR2019/014440, filed on Oct. 30, 2019, which claims the benefit of earlier filing date and right of priority to Korean Application No. 10-2019-0005686, filed on Jan. 16, 2019, the contents of which is hereby incorporated by reference herein in its entirety.

TECHNICAL FIELD

The present disclosure relates to a projector of which structure is simplified in a manner that an adjustment dial for adjusting a position of a projection lens is rotated centering around a single axis.

BACKGROUND ART

Projectors are often used as projection devices that project images or picture data onto screens. A projector may collect light emitted from a light source on a panel and display it on a screen. A projector is used for audiovisual purposes of various presentations or multimedia instructions in a manner of projecting such data onto a screen by being directly connected to an image device such as a computer or camcorder, or to implement a home theater or the like for watching images of movies and the like at home.

A projector includes a position adjustment device that adjusts a position of a projection lens so that a projected image is located exactly on a screen. A position adjustment unit adjusts the position of the projection lens in a vertical or horizontal direction if a user turns a dial exposed to an outside of a case. For vertical and horizontal adjustments, a dial that rotates around at least two axes is included, which requires a projector with a design that can reduce the volume of the position adjustment unit of the projection lens by connecting gears complexly and increasing a volume of the projector.

DISCLOSURE OF THE INVENTION

Technical Task

To solve the above problem, the present disclosure relates to a projector of which structure is simplified in a manner that an adjustment dial for adjusting a position of a projection lens is rotated centering around a single axis.

Technical Solutions

In one technical aspect of the present disclosure, provided is a projector including a housing, a projection unit projecting an image, a projection lens module enlarging and projecting the image projected from the projection unit to an external screen, and a position adjustment unit controlling positions of a first direction and a second direction of the projection lens module, the position adjustment unit including a first fixed bracket fixed to the housing and including an opening perforated by the projection lens, a first movement bracket located on one side of the fixed bracket and enclosing a circumference of the projection lens, a second movement bracket located on one side of the first movement bracket and enclosing the circumference of the projection lens, a screw fastened to the first movement bracket in the first direction, a first dial coupled to an end portion of the screw to be exposed externally, a second dial located on a circumference of the first dial in a ring shape, and a gear module moving the second movement bracket in the second direction on rotation of the second dial.

When the first dial rotates, the screw rotates and the first movement bracket including a helix groove engaging with a helix of the screw may move in the first direction.

The projector may include a first guide slot extended in the first direction and a first guide projection, the first guide slot and the first guide projection may be located between the first movement bracket and the fixed bracket, and a length of the first guide slot may correspond to a moving distance of the first guide bracket in the first direction.

The projector may include a second guide slot extended in the second direction and a second guide projection. The second guide slot and the second guide projection may be located between the second movement bracket and the first movement bracket. When the first movement bracket moves in the first direction, the second movement bracket may move in the first direction. When the second movement bracket moves in the second direction, the first movement bracket may not move and the second guide projection may move in the second direction along the second guide slot.

The projector may include a ring-shaped bushing having the screw inserted therein and a leaf spring fixing the ring-shaped bushing to the first fixed bracket, and the ring-shaped bushing may prevent the screw from moving in the first direction or the second direction.

The gear module may further include a dial gear formed on a circumference of the second dial and a dial gear rotating in response to rotation of the dial gear and provided with a long hole in which a transfer pin of the second movement bracket is inserted.

The projector may further include a center gear inserted between the dial gear and the guide gear, the center gear including a first gear engaging with the dial gear and a second gear engaging with the guide gear and disposed in a manner of overlapping with the first gear, and a diameter of the first gear may be greater than that of the second gear.

The guide gear may have a fan shape having a rotation shaft coupled to the first fixed bracket, the long hole may be extended from an end portion of the gear in a rotation axis direction, and a length of the transfer pin may be greater than a moving distance of the first movement bracket in the first direction.

The projection lens module may be fixed to the second bracket and an opening of the first movement bracket may be greater than a size of the projection lens module in the second direction by at least a moving distance of the second movement bracket in the second direction.

The projector may further include a second fixed bracket located on one side of the second movement bracket and fastened to the first fixed bracket.

The projector may further include a leaf spring located between the second fixed bracket and the second movement bracket so as to pressurize the second movement bracket and the first movement bracket in a direction of the first fixed bracket.

The projector may include a fixed pin having one end touching the second movement bracket by perforating the second fixed bracket, a helix formed on an outer circumference of the fixed pin, and a third dial coupled to the other end of the fixed pin and exposed externally. If the third dial rotates, the fixed pin may pressurize the second movement bracket in a direction of the first fixed bracket.

The projector may include a fixed pin including a helix formed on an outer circumference, a fixture including a screw hole having a helix groove formed to engage with the helix of the fixed pin and touching the second movement bracket by perforating the second fixed bracket, and a third dial coupled to the other end of the fixed pin and exposed externally. If the third dial rotates, the fixed pin may pressurize the second movement bracket in a direction of the first fixed bracket.

Advantageous Effects

Advantageously, a projector according to the present disclosure implements a position adjustment unit that moves in two directions with a single rotation axis, thereby reducing a volume of the position adjustment unit.

Advantageously, the number of gears used for a position adjustment unit is reduced to provide low complexity, thereby securing product quality and price competitiveness.

Advantageously, disposition is facilitated by placing a dial position at a center of a projection lens, thereby resolving the difficulty in disposing two adjustment dials for bilateral symmetry and providing a symmetric appearance in design.

Effects obtainable from the present disclosure may be non-limited by the above-mentioned effects. And, other unmentioned effects can be clearly understood from the following description by those having ordinary skill in the technical field to which the present disclosure pertains.

BEST MODE FOR INVENTION

Description will now be given in detail according to exemplary embodiments disclosed herein, with reference to the accompanying drawings. However, the present disclosure is not limited to these embodiments and of course can be modified into various forms.

For the sake of clear and brief description with reference to the drawings, the same or equivalent components may be provided with the same reference numbers, and description thereof will not be repeated.

In general, a suffix such as "module" and "unit (or part)" may be used to refer to elements or components. Use of such a suffix herein is merely intended to facilitate description of the specification, and the suffix itself is not intended to give any special meaning or function. Therefore, the above "module" and "unit (or part)" may be used interchangeably.

In addition, terms containing ordinal numbers, such as 1, 2, etc., used in this specification, may be used to describe various components, but these components should not be limited by the terms above. These terms are used only to distinguish one component from another. For example, a first component may be named a second component without departing from the scope of the rights of the present disclosure, and similarly a second component may be named a first component.

Figure 1:
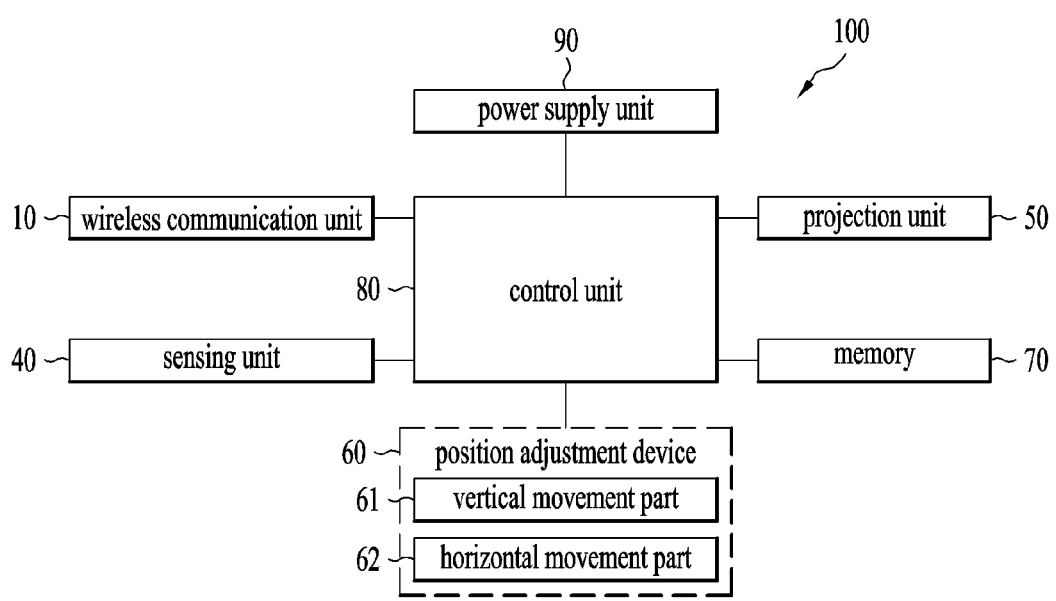
FIG. 1 is a block diagram to describe a projector related to the present disclosure.

FIG. 1 is a block diagram to describe a projector 100 related to the present disclosure.

Figure 3:
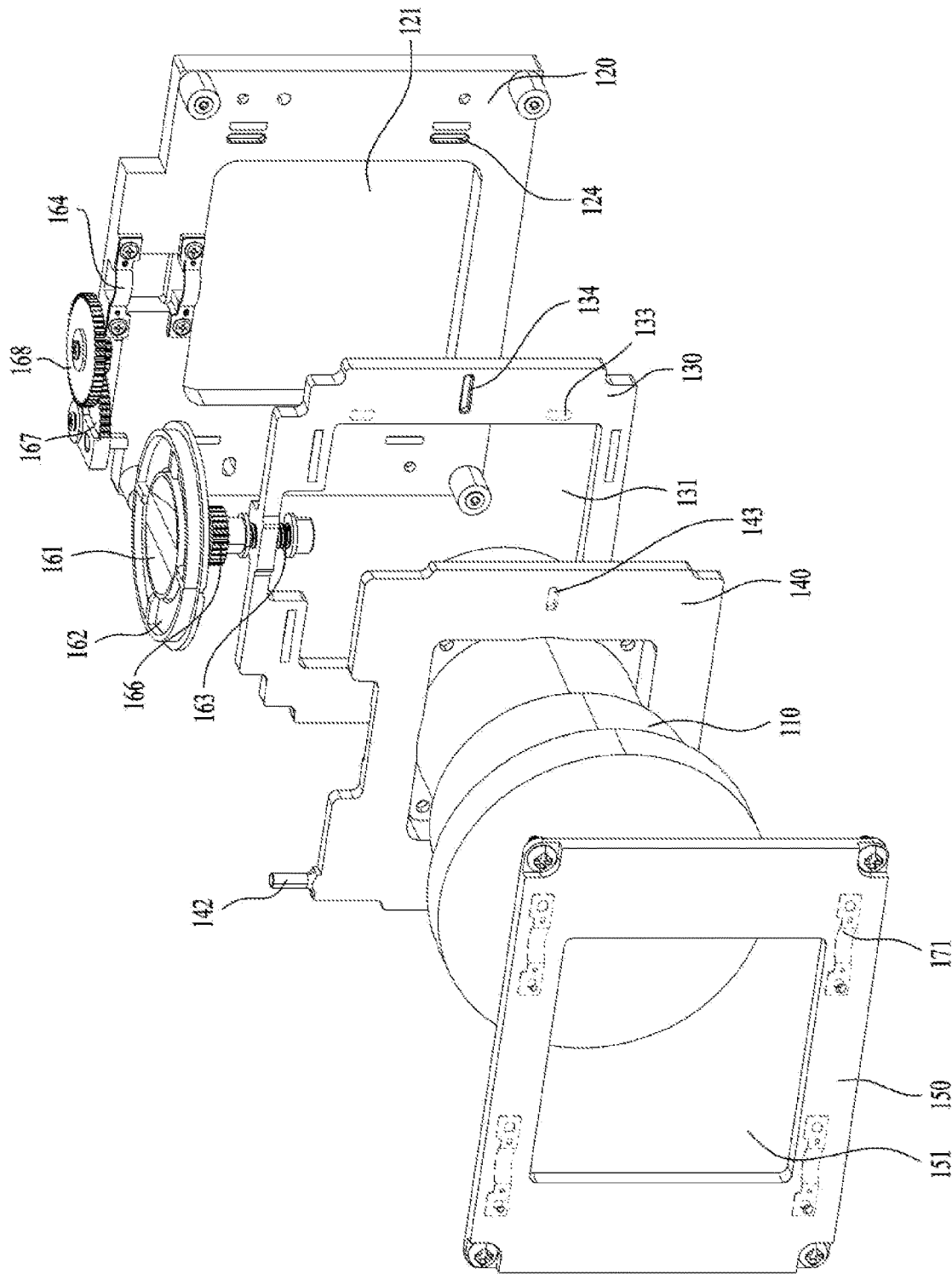
FIG. 3 is an exploded perspective diagram of FIG. 2.

A projector 100 may include a wireless communication unit 10, a sensing unit 40, a projection unit 50, a position adjustment unit 60, a power supply unit 90, etc. As the components shown in FIG. 3 are not mandatory to implement the projector 100, the projector 100 described in the present specification may have components more or less than those listed above.

The wireless communication unit 10 may transceive signals using a mobile communication module or a short-range communication module. Particularly, the wireless communication unit 10 may transceive specific commands or information with an external terminal. The wireless communication unit 10 may receive images such as photos, moving pictures and the like from the external terminal. In addition, the wireless communication unit 10 may provide a function of controlling the projector 100 by wireless like a remote controller using the short-range communication module.

The wireless communication unit 10 may receive a broadcast signal and/or broadcast related information from an external broadcast management server through a broadcast channel using a broadcast reception module. In addition, the wireless communication unit 10 may obtain a current location of the projector 100 using a position information module.

The sensing unit 40 may detect a presence or non-presence of an object approaching a prescribed detection surface or an object existing around without mechanical contact using a force of an electromagnetic field, infrared rays or the like.

The projection unit 50 performs a function of projecting an image signal. An image projection unit 51 may be implemented in a manner of including a light source, a transmissive display device, a projection lens and the like. The image projection unit 51 may include a projection lens module 110 for adjusting a size of a projected image on a projection area.

The position adjustment unit 60 performs a function of adjusting a direction in which the projector 100 projects an image. Particularly, the position adjustment unit 60 performs a functions of adjusting a position of the projection unit 50. To this end, the position adjustment unit 60 may include a vertical movement part 61 and a horizontal movement part 62. The vertical movement part 61 may move the projection unit 50 up and down, and the horizontal movement part 61 may move the projection unit 50 right and left. A camera 20, the sensing unit 40 and/or the projection unit 50 of the projector 100 may be moved in top, bottom, right and left directions by the position adjustment unit 60.

The memory 70 may store an image to project, adjacent space information and/or projection area information.

In a manner of being combined with the wireless communication unit 10, the sensing unit 40, the projection unit 50, the position adjustment unit 60 and/or the memory 70, the control unit 80 may analyze a surrounding space structure, analyze a projection area, perform image correction, project an image, or transceive signals with an external terminal. Namely, the control unit 80 may control one or more of the above components in a manner of combining them to implement various embodiments described in the following.

The power supply unit 90 receives an external power or an internal power under the control of the control unit 80, thereby supplying a power necessary for an operation of each component. The power supply unit 90 may include a detachable battery.

Figure 2:
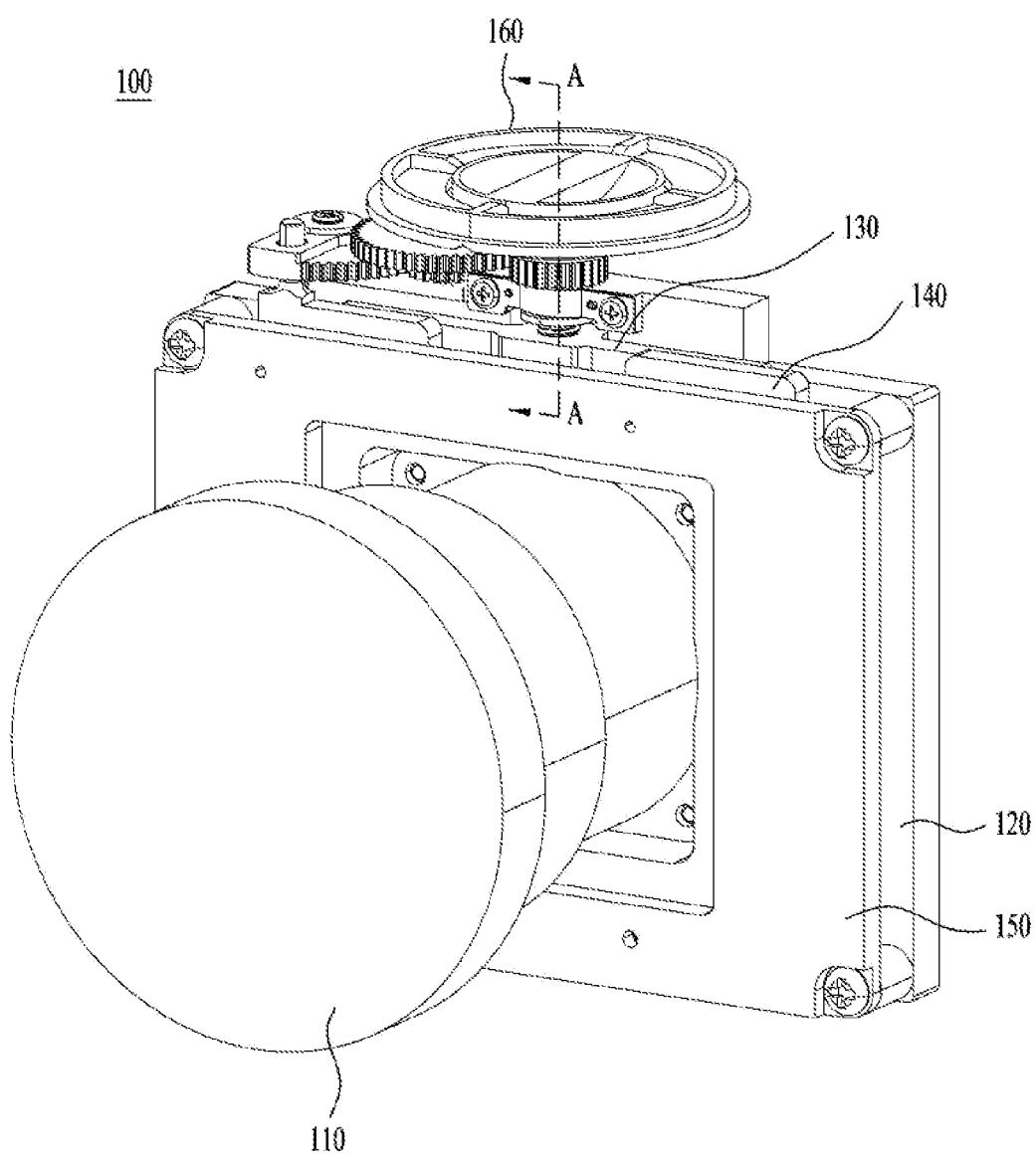
FIG. 2 is a diagram showing a projection lens and a position adjustment unit of a projector according to one embodiment of the present disclosure.

FIG. 2 is a diagram showing a projection lens and a position adjustment unit 60 of a projector 100 according to one embodiment of the present disclosure, and FIG. 3 is an exploded perspective diagram of FIG. 2. The configuration of FIG. 1 is installed in a housing 190 (see FIG. 1), an opening is formed in the housing 190 to output an image projected from a projection lens, and a dial 160 is exposed to an outside of the housing 190.

Generally, a dial for the vertical movement part 61 and a dial for the horizontal movement part 62 are separately provided. Yet, according to the present disclosure, as shown in FIG. 2, a dial 160 that rotates centering around a single rotation axis is located at the center of the projector 100. As a second dial 162 located on a circumference of a first dial 161 rotates centering around a single rotation axis, an externally exposed dial may be implemented as one.

A projection lens module 110 is a cylindrical member having a plurality of lenses combined to adjust a size of an image outputted from the projection unit 50 and includes a plurality of brackets in which an opening perforated by the projection lens is formed.

A fixed bracket located on a front side and a backside among four brackets is fixed to the housing 190 not to move and includes a first movement bracket 130 moving in a first direction relatively to the fixed bracket and a second movement bracket 140 moving in a second direction. The first direction and the second direction mean a vertical direction and a horizontal direction in the drawing, respectively, and the first direction and the second direction may be changed. For clarity of the description, the first direction and the second direction may mean a vertical direction and a horizontal direction, respectively. A front side means a direction faced by the projection lens and a rear side may mean an opposite direction.

Figure 4:
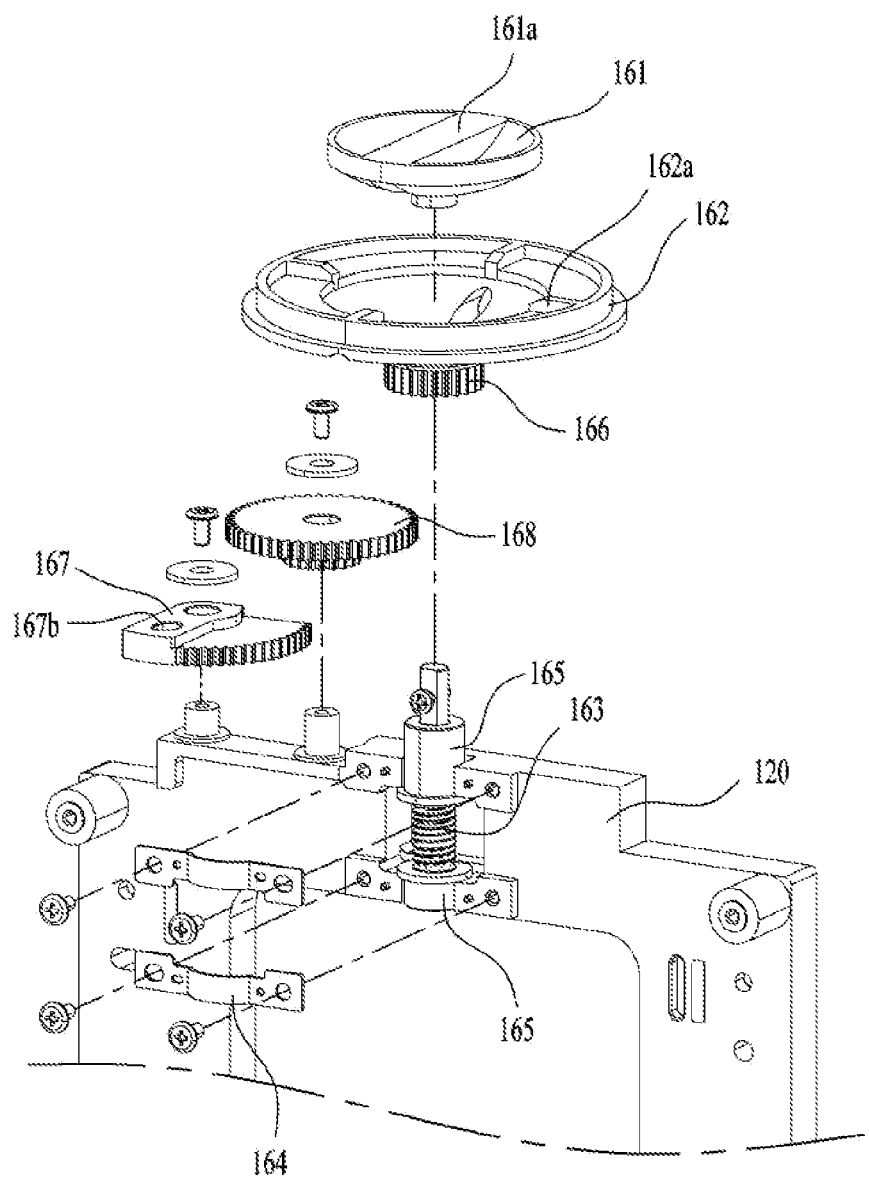
FIG. 4 is an A-A cross-sectional diagram of FIG. 2.
Figure 5:
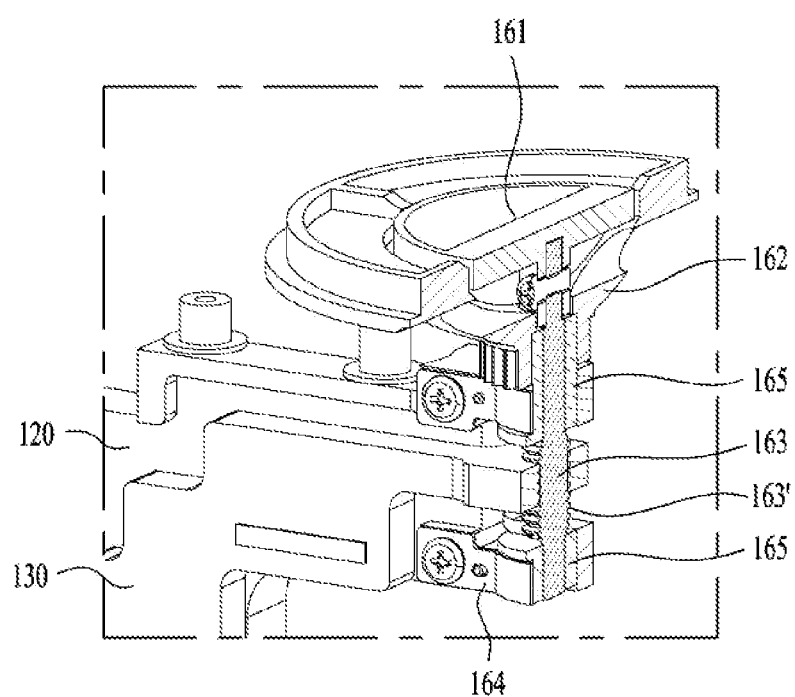
FIG. 5 is an exploded perspective diagram of a position adjustment dial of a projector related to the present disclosure.

A first fixed bracket 120 located on a most rear side is fixed to the housing 190 and a rotation shaft of a dial is fixed to thereto. FIG. 4 is an A-A cross-sectional diagram of FIG. 2, and FIG. 5 is an exploded perspective diagram of a dial.

A first dial 161 is connected to a screw 163 and may rotate around the screw 163 as an axis. As shown in FIG. 3, the screw 163 is a bar-shaped member having a helix formed on an outer surface, a helix formed portion is coupled to the first movement bracket 130, and the screw 163 is fixed to the first fixed bracket 120 in a manner of being rotatable and immovable in a vertical direction.

A bushing 165 is provided to a top and bottom of the helix-formed portion 163' and fastened to the first fixed bracket 120. As a member size of the bushing 165 is small, it is difficult to directly insert a fastener for fixing to the first fixed bracket 120. Hence, as shown in FIG. 2 and FIG. 3, the bushing 165 may be fastened to the first fixed bracket 120 using a leaf spring 164. An end portion of the bushing 165 may be expanded to restrict a motion by preventing the bushing 165 from moving in top and bottom directions. If the first dial 161 rotates, the screw 163 rotates, whereby the first moving bracket 130 engaging with the helix of the screw 163 moves in a vertical direction.

A second dial 162 is located on an outer circumference of the first dial 161 and rotates around the same axis of the first dial 161. As the second dial 162 is not directly fastened to the screw 163, it rotates independently from the first dial 161 and the screw 163. To rotate the second dial 162 independently from the first dial 161, the first dial 161 may be configured to protrude, or, as shown in FIG. 5, an uneven portion 161a may be formed on a top surface of the first dial 161 to be held with user's fingers. As shown in FIG. 5, an uneven portion 162a is formed on a top surface of the second dial 162 or an uneven portion is formed on a lateral circumference of the second dial 162 to increase a frictional force, whereby a user may rotate the second dial 162 by holding a lateral side of the second dial 162.

The second dial 162 is connected to a gear part that transfers a rotational force of the second dial 162 to the second movement bracket 140. This will be described later with reference to FIGS. 8 to 11.

And opening 121 through which a projection lens passes is formed at a center of the first fixed bracket 120 and may have a size greater than a diameter of the projection lens by a size corresponding to the moving distances of the first and second movement brackets 130 and 140.

The first movement bracket 130 is located in front of the first fixed bracket 120, the second movement bracket 140 is located in front of the first movement bracket 130, and a second fixed bracket 150 fastened to the first fixed bracket 120 and supporting the first and second movement brackets 130 and 140 not to move in front and rear directions is further included.

Figure 6:
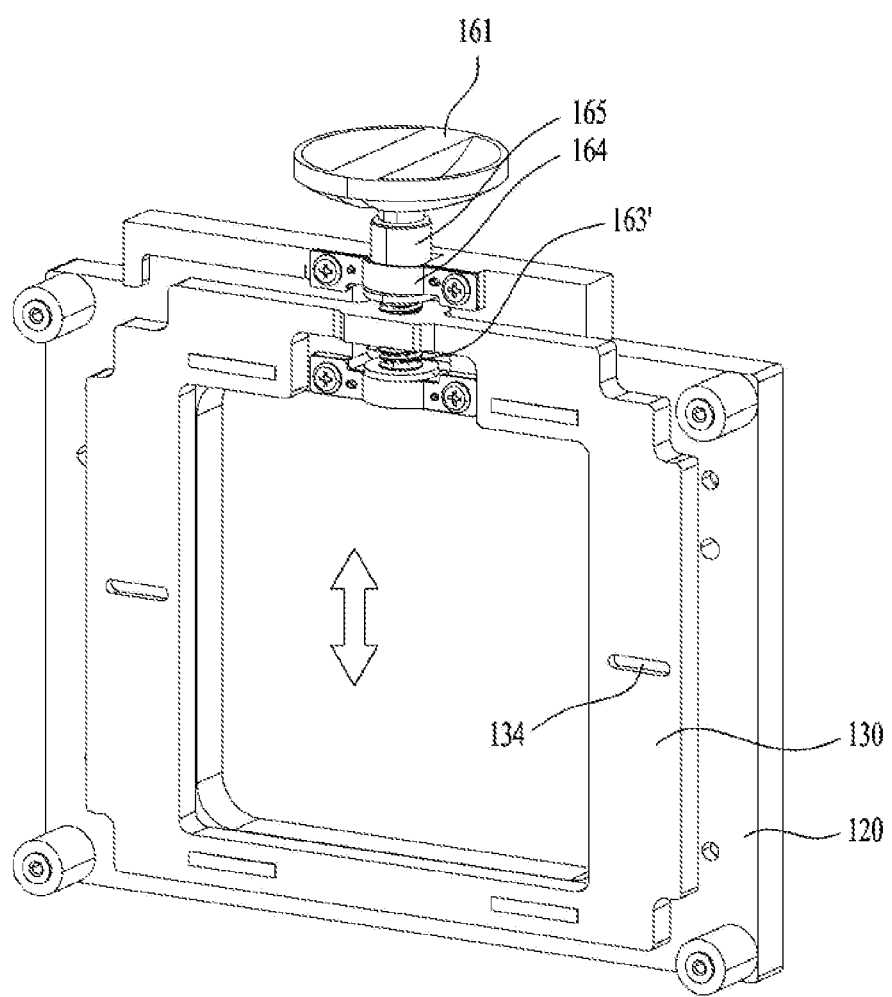
FIG. 6 is a diagram to describe a first direction adjustment of a position adjustment unit of a projector according to one embodiment of the present disclosure.

FIG. 6 is a diagram to describe an operation of the first movement bracket 130. As the screw 163 is fixed to the first fixed bracket, the first movement bracket 130 moves in a first direction relative to the first fixed bracket 120 and a moving distance of the first movement bracket 130 may be limited between a pair of the bushings 165.

A first guide projection 133 located between the first movement bracket 130 and the first fixed bracket and formed on one of the two members and a first guide slot 124 formed in the other may be further included. In the drawing, the first guide slot 124 is shown as formed in the first fixed bracket 120 and the first guide projection 133 is shown as formed on the first movement bracket 130. Yet, such locations may be switched to each other. The first guide slot 124 is extended in a first direction. When the first movement bracket 130 moves in the first direction, the first guide projection 133 moves along the first guide slot 124. The first movement bracket 130 may be guided to move in the first direction without shaking, and a moving distance of the first movement bracket 130 may be limited as well.

Figure 7:
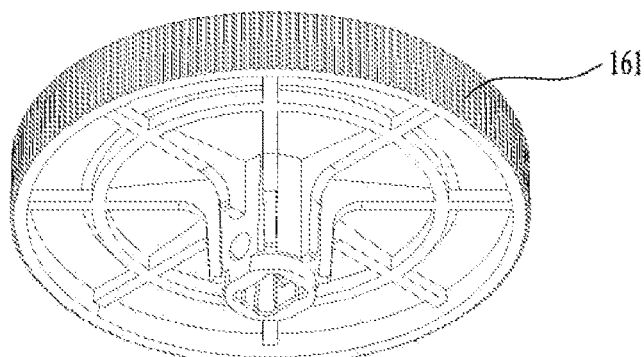
FIG. 7 is a diagram showing a first embodiment of a first dial of a projector.
Figure 7:
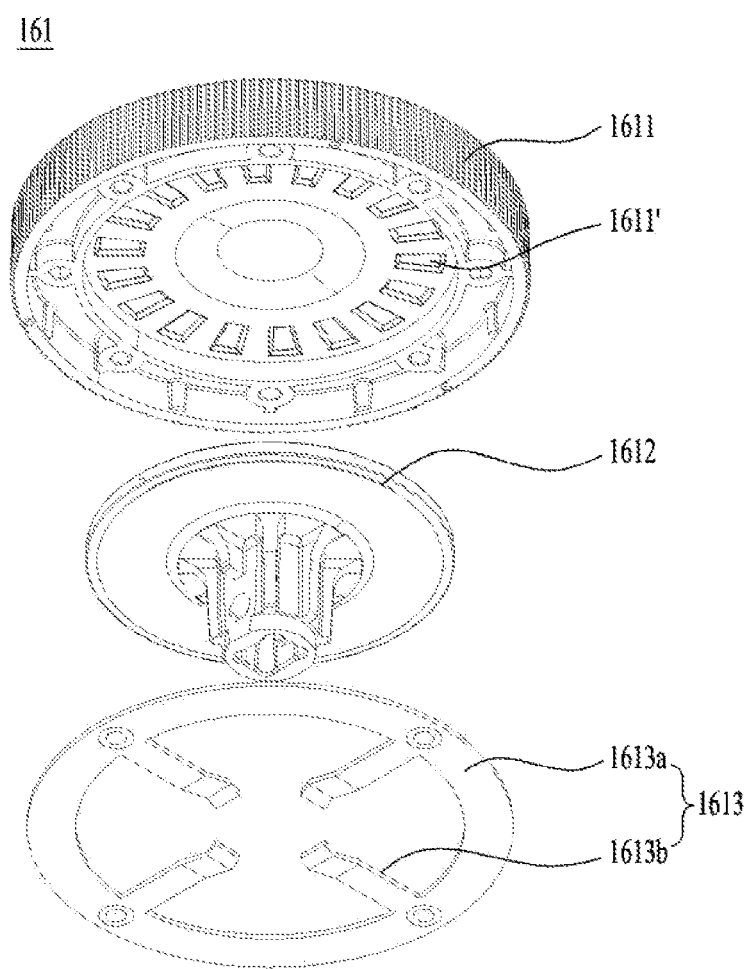

FIG. 7 is a diagram showing an embodiment of a first dial 161 of a projector. FIG. 7 (*a*) shows that the first dial 161 is formed as an integral part, and FIG. 7 (*b*) shows an embodiment of having a torque limiter. As shown in FIG. 7 (*a*), as the first dial 161 is fastened to the screw 163, if the first dial 161 is rotated, the screw 163 may be rotated. When the first movement bracket 130 is located at an end portion in a movable distance, if the first dial 161 is rotated, a force may be applied to the first movement bracket 130 excessively.

To solve such a problem, as shown in FIG. 7 (*b*), a torque limiter may be provided. Although the torque limiter transfers a force of a first member to a second member, if the second member is fixed, the force of the first member is not transferred. Hence, it is able to prevent a force from being applied to the second member excessively.

The first dial 161 includes an outer dial 1611 exposed externally and rotated directly by a user in a manner of being held by the user and an inner dial 1612 fastened to the screw 163. And, torque limiter prominences and depressions 1611' engaging with each other may be formed between the inner dial 1612 and the outer dial 1611. Although torque limiter prominences and depressions of the inner dial 1612 are not shown in the drawing, the prominences and depressions configured to engage with the torque limiter prominences and depressions of the outer dial may be formed on a surface toward the outer dial 16112.

The torque limiter prominences and depressions 1611' may be formed repeatedly in the same distance from the center, whereby positions of the inner dial 1612 and the other dial 1611 may be variable in response to a space between the torque limiter prominences and depressions 1611'. When the first movement bracket 130 is located in a movable range, rotation of the screw 163 is non-restricted. Hence, the inner dial 1612 and the other dial 1611 may rotate in a manner that the torque limiter prominences and depressions 1611' overlap each other. In doing so, an elastic fixed part 1613 is usable to enable the inner dial 1612 to adhere closely to the outer dial 1611. The elastic fixed part 1613 includes a fixed part 1613a fixed to the outer dial 1611 and an elastic part 1613b applying a force to enable the inner dial 1612 to adhere closely in a direction of the outer dial 1611.

When the screw 163 connected to the inner dial 1612 is rotatable, the elastic part 1613b applies a force to enable the torque limiter prominences and depressions 1611' of the inner and outer dials 1612 and 1611 to engage with each other so that the screw 163 can rotate with the outer dial 1611. If the screw 163 reaches a position at which further rotation is not possible (e.g., if the first movement bracket 130 reaches a maximum movement position), the inner dial 1612 does not rotate but the outer dial 1611 rotates only. In this case, the elastic part 1613b is deformed to enable the inner dial 1612 to move in a range corresponding to the height of the torque limiter prominences and depressions 1611', the outer dial 1611 rotates only, and the inner dial 1612 is fixed as it is. When a user turns the first dial 161, if the user hears a sound that the torque limiter prominences and depressions 161' of the inner and outer dials 1612 and 1611 engage with each other, the user may stop the rotation of the first dial 161.

Figure 8:
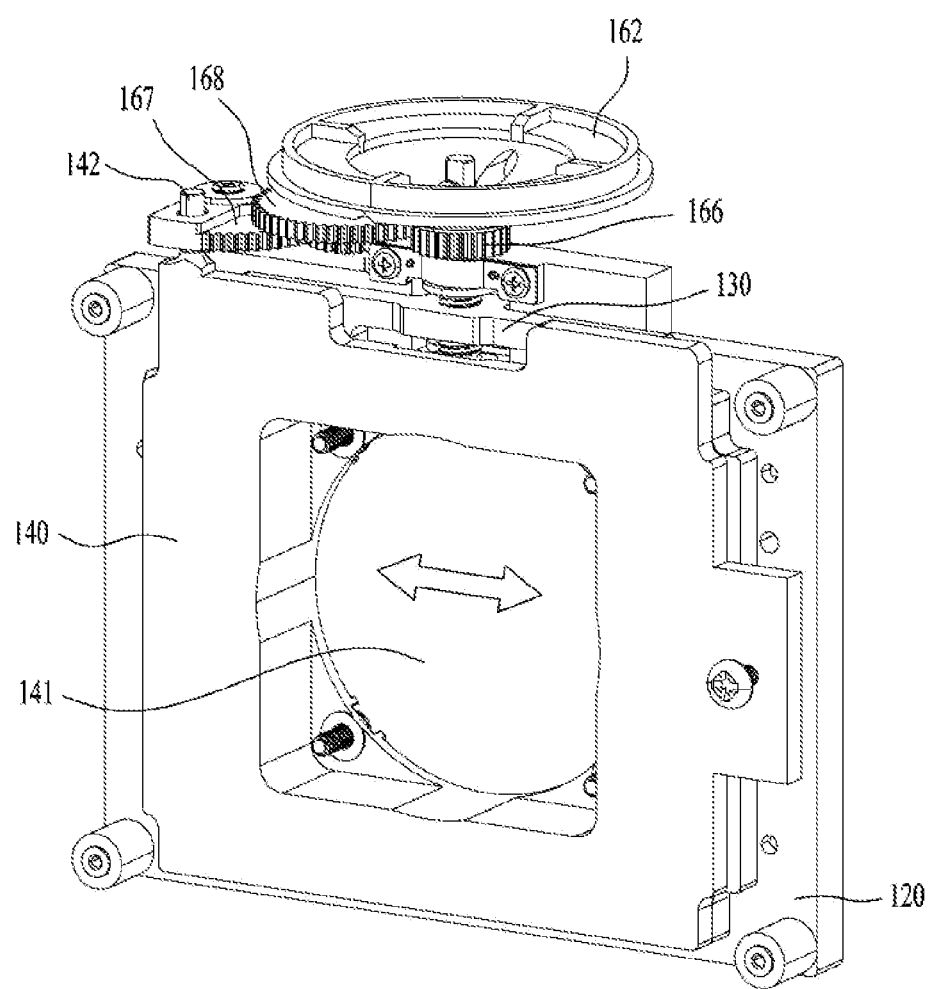
FIG. 8 is a diagram to describe a second direction adjustment of a position adjustment unit of a projector according to one embodiment of the present disclosure.
Figure 9:
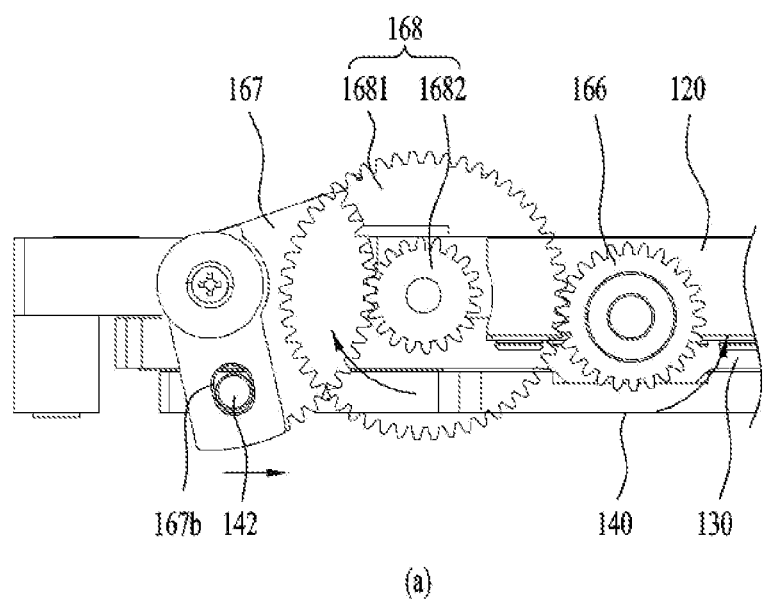
FIG. 9 is a diagram to describe an operation of gears for horizontal adjustment of a position adjustment unit of a projector according to one embodiment of the present disclosure.
Figure 9:
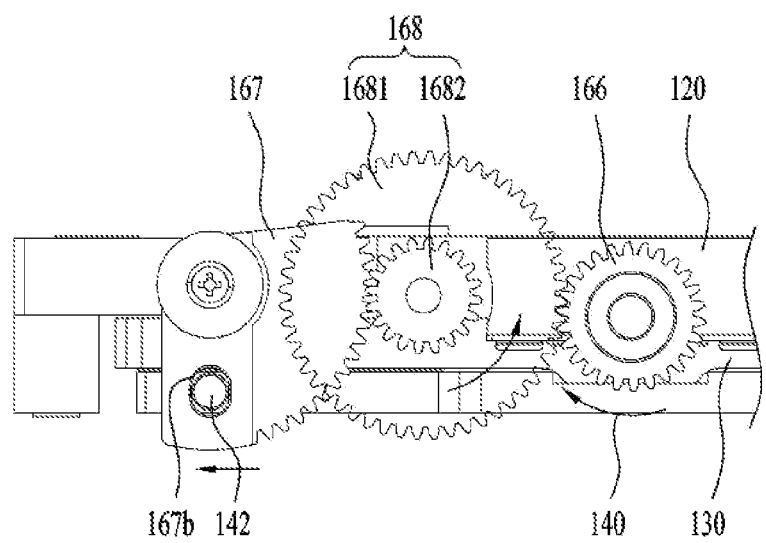

FIG. 8 is a diagram to describe a second direction adjustment of the position adjustment unit 60 of the projector 100 according to one embodiment of the present disclosure. FIG. 9 is a diagram to describe an operation of gears for horizontal adjustment of the position adjustment unit 60 of the projector 100 according to one embodiment of the present disclosure. The second movement bracket 140 located in front of the first movement bracket 130 is movable in a second direction vertical to the first direction, and the projection lens module 110 is fixed to the second movement bracket. As the second movement bracket 140 moves in the second direction, the projection lens module 110 may move in the second direction.

When the second dial 162 is rotated, the gear part moves the second movement bracket 140 in the second direction. To this end, as shown in FIG. 9, the gear part configured with a plurality of gears is included and each of the gears rotates centering on an axis fixed to the first fixed bracket 120. A dial gear 166 includes sawteeth formed on a circumference of the second dial 162. When the second dial 162 rotates, the dial gear 166 rotates as well.

A guide gear 167 includes a long hole 167b in which a transfer pin 142 extended from the second movement bracket 140 is inserted and is a gear in a fan shape. The long hole 167b is a hole that is long in one direction, and a tolerance may occur to convert a rotational motion of the guide gear 167 to a straight-line motion of the second movement bracket 140. FIG. 9 (*a*) shows a state that the second movement bracket 140 has moved in a right direction, and FIG. 9 (*b*) shows a state that the second movement bracket 140 has moved in a left direction. When the second movement bracket 140 moves in the second direction, a position of the transfer pin 142 inserted in the long hole 167b may be changed. The transfer pin 142 needs to be formed longer than a moving distance of the first direction in order to prevent the second movement bracket 140 from touching the gear part when moving in the first direction.

A center gear 168 located between the guide gear 167 and the dial gear 166 may include a first gear 1681 transferring a rotational force to the guide gear 167 on rotation of the dial gear 166 and engaging with the dial gear 166 and a second gear 1682 engaging with the guide gear 167 and disposed in a manner of overlapping with the first gear 1681. It is able to finely adjust a position using the second dial 162 in a manner of differentiating a size of the first gear 1681, a size of the second gear 1682 or density of gear teeth.

As the first movement bracket 130 moves in the first direction, the projection lens module 110 moves in the first direction. When the second bracket moves in the second direction, the first movement bracket 130 does not move. Yet, when the first movement bracket 130 moves in the first direction, the second bracket moves in the first direction as well and the projection lens module 110 may be moved in the first direction.

In order to configure the first movement bracket 130 and the second movement bracket 140 to move together in the first direction when the first dial 161 is rotated to move the projection lens module 110 in the first direction or configure only the second movement bracket 140 to move in the second direction when the second dial 162 is rotated to move the projection lens module 110 in the second direction, a second guide slot 134 and a second guide projection 143 may be provided between the first movement bracket 130 and the second movement bracket 140.

The second guide slot 134 is extended in the second direction. When the second movement bracket 140 moves in the second direction, the first movement bracket 140 does not move but the second guide projection 143 moves along the second guide slot 134. Yet, when the first movement bracket 130 moves in the first direction, the second guide projection 143 fails to move along the second guide slot 134 and the second movement bracket 140 moves in the first direction.

Figure 10:
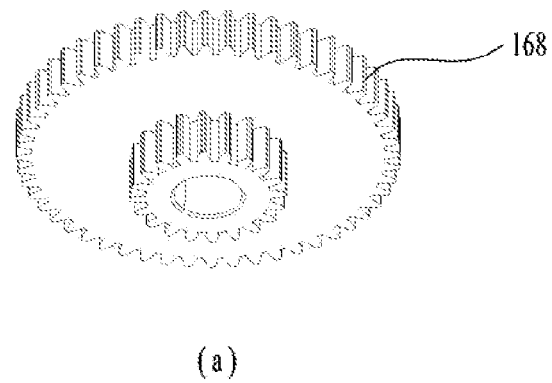
FIG. 10 is a diagram showing an embodiment of a center gear of a projector.
Figure 10:
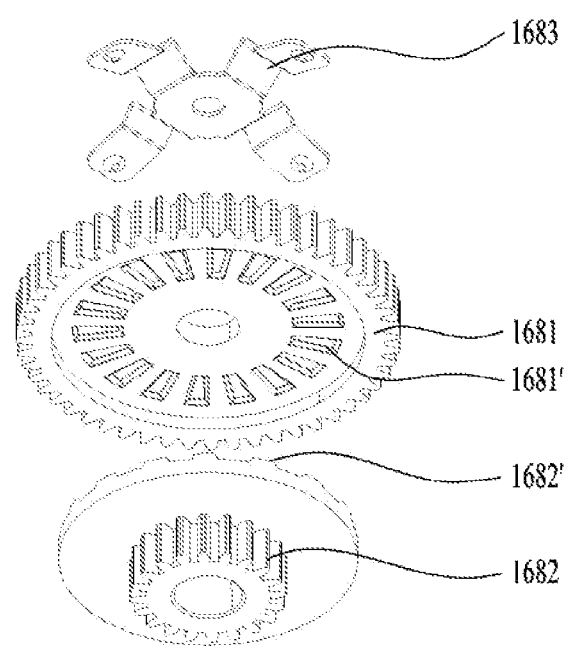

FIG. 10 is a diagram showing an embodiment of the center gear 168 of the projector. As shown in FIG. 10 (a), it is able to use a center gear 168 including a first gear 1681 and a second gear 1682 formed as an integral part. Yet, in case that the second dial 162 is rotated beyond a movable range of the second movement bracket 140, the position adjustment unit 60 may be loaded. To prevent this, like the first dial 161 having the torque limiter 1611' of FIG. 7 (b), a torque limiter 1681' and 1682' may be provided to the center gear 168 (shown in FIG. 10 (b)).

The first and second gears 1681 and 1682 of the center gear 168 are separated from each other and torque limiter prominences and depressions 1681' and 1682' may be formed between the first and second gears 1681 and 1682. An elastic fixed part 1683 that pushes the first gear 1681 toward the second gear 1682 to enable the first gear 1681 to adhere closely to the second gear 1682 may be included. The elastic fixed part 1683 applies a force to rotate the first and second gears 1681 and 1682 together when the second movement bracket 140 is in a movable range. If the second movement bracket 140 attempts to deviate from the movable range, the elastic fixed part 1683 may be deformed to enable the first gear 1683 to rotate only while controlling the second gear 1682 not to rotate. Since the rotational force of the second dial 162 is not transferred to the second movement bracket 140 like the aforementioned first dial, the movement unit 60 may be prevented from being broken or damaged due to applying an excessive force to rotate the second dial 162.

Figure 11:
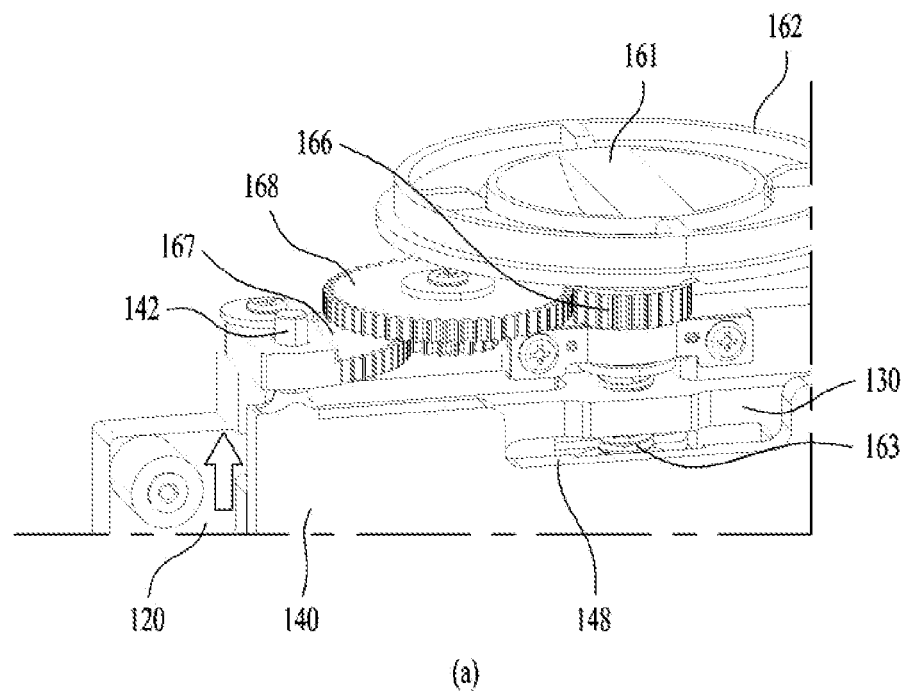
FIG. 11 is a diagram to describe disposition of a horizontal moving part for vertical adjustment of position adjustment unit of a projector according to one embodiment of the present disclosure.
Figure 11:
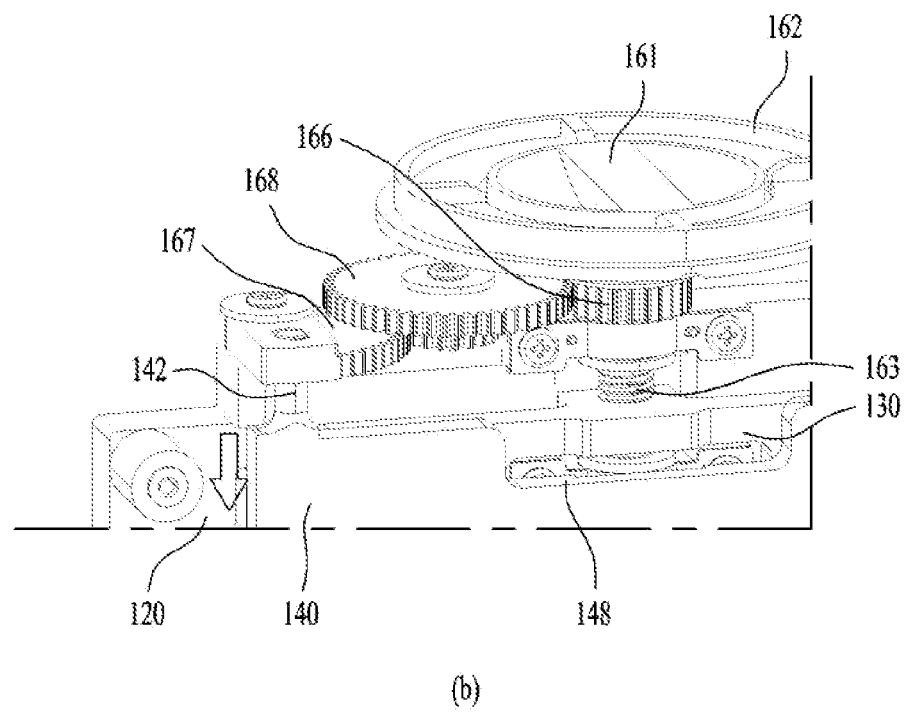

FIG. 11 is a diagram to describe the disposition of the horizontal movement part on a vertical adjustment of the position adjustment unit 60 of the projector 100 according to one embodiment of the present disclosure. When the second movement bracket 140 moves in the second direction, the movement pin coupled to the guide gear 167 moves the long hole 167b in the first direction and the gear part is not affected by the motion of the first direction. FIG. 11 (a) shows upward movement and FIG. 11(b) shows downward movement.

Figure 12:
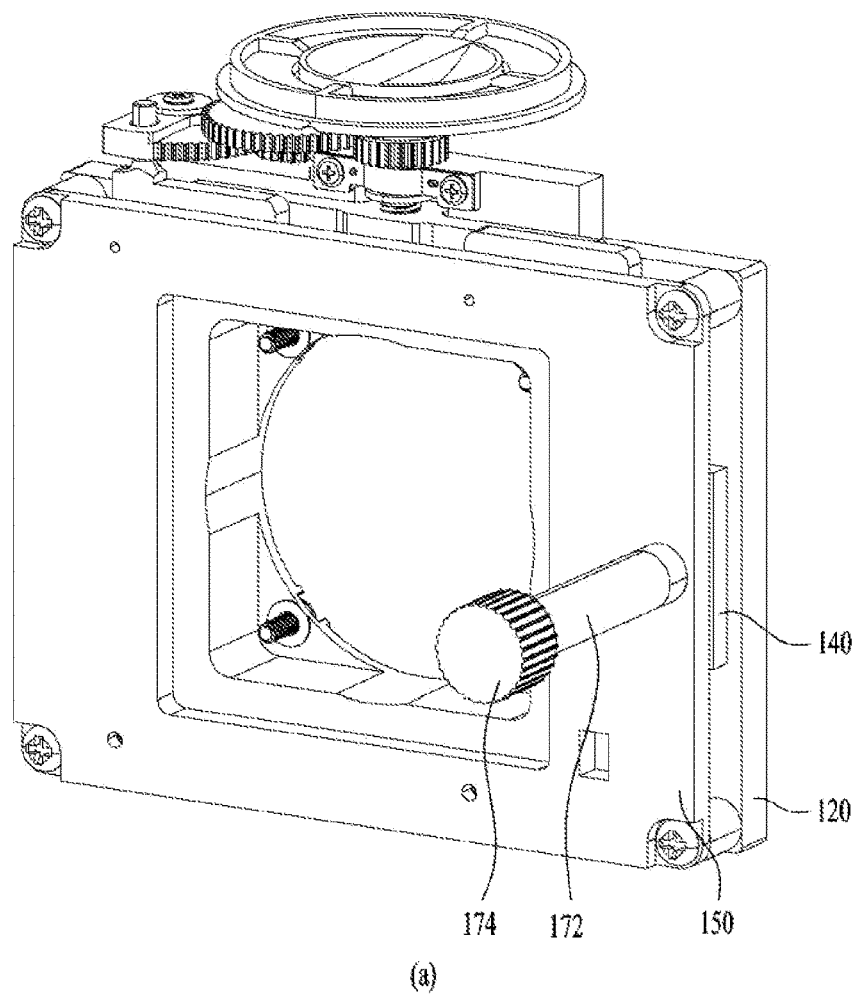
FIG. 12 is a diagram showing one example of a fixing device and a position adjustment unit of a projector according to one embodiment of the present disclosure.
Figure 12:
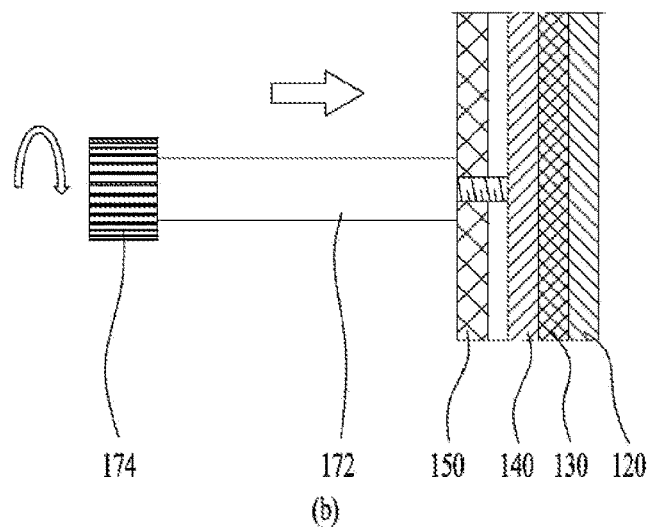

FIG. 12 (a) is a diagram showing one example of a fixed device of the position adjustment unit 60 of the projector 100 according to one embodiment of the present disclosure. The second fixed bracket 150 is fastened to the first fixed bracket 120, thereby fixing the first movement bracket 130 and the second movement bracket 160 in a thickness direction (e.g., a third direction). Yet, since the first movement bracket 130 and the second movement bracket 140 should move in the first direction and the second direction, as shown in FIG. 3, a member having elasticity not to restrict motions of the first direction and the second direction despite applying a force to the first movement bracket 130 and the second movement bracket 140 in the third direction may be included in a manner of providing an elastic body such as a leaf spring or a coil spring to a surface of the second fixed bracket 150 that faces the second movement bracket 140.

Yet, a fixed member may be further included to fix the projection lens module 110 not to move in case that a user determines a position of the projection lens module 110 using the position adjustment unit 60. As a device for fixing a position by pressurizing the second movement bracket 140 in the third direction, the fixed member may further include a third dial 174 exposed to an outside of the housing 190. When a position of the projection lens module 110 is adjusted using the first dial 161 or the second dial 162, the third dial 174 does not pressurize the second movement bracket 140. If the adjustment is completed, the third dial 174 pressurizes the second movement bracket 140.

A user may fix a position of the projection lens module 110 by adjusting pressurization/depressurization of the second movement bracket in a manner of rotating the third dial 174. According to the embodiment shown in FIG. 12 (b), a fixed pin 172 having one end touching the second movement bracket 140 by perforating the second fixed bracket 150 is included, a helix is formed on an outer circumference of the fixed pin 172, and a hole having a helix groove formed to correspond to the helix may be formed in the second fixed bracket.

The third dial 174 coupled to the other end of the fixed pint 172 and exposed externally is included. If the third dial 174 is turned, the fixed pin 172 may fixe the second movement bracket 140 in a manner of pressurizing the second movement bracket 140 in a direction of the first fixed bracket 120.

Figure 13:
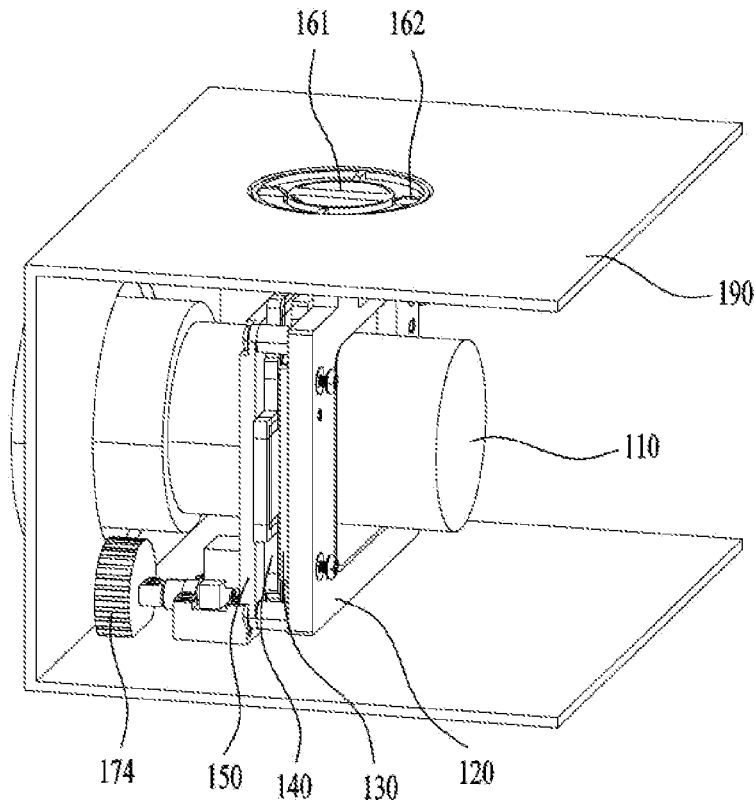
FIG. 13 is a diagram showing another example of a fixing device and a position adjustment unit of a projector according to one embodiment of the present disclosure.
Figure 13:
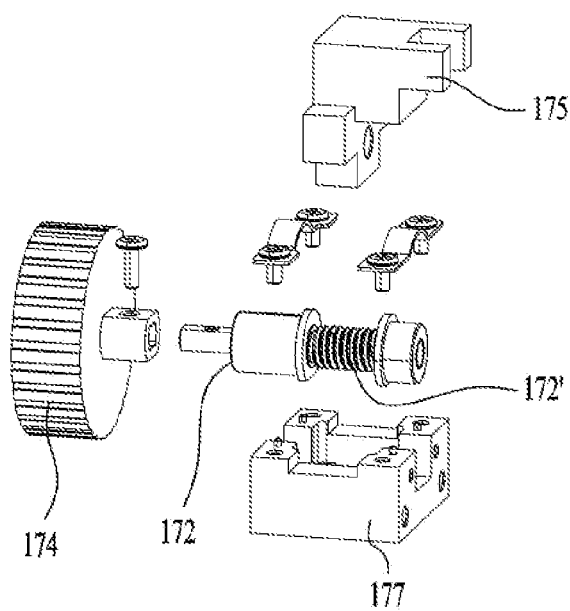

FIG. 13 (a) is a diagram showing another example of the position adjustment unit 60 of the projector 100 according to one embodiment of the present disclosure. According to the present embodiment, a third dial is located not in a front direction of the projector 100 but in a bottom direction and the third dial 174 is exposed partially instead of being exposed entirely, whereby an externally exposed area can be minimized.

As shown in FIG. 13 (b), a fixed pin 172 including a helix 172' formed on an outer circumference is coupled to the housing 190 in the present embodiment, a screw hole provided with a helix groove engaging with the helix 172' of the fixed pin 172 is included, and a fixture 175 touching the second movement bracket 140 by perforating the second fixed bracket 150 is included. The fixture 175 moves in the third direction when the fixed pin 172 rotates. If the third dial 174 rotates, the fixed pin 172 may pressurize the second movement bracket 140 in the direction of the first fixed bracket 120.

Figure 14:
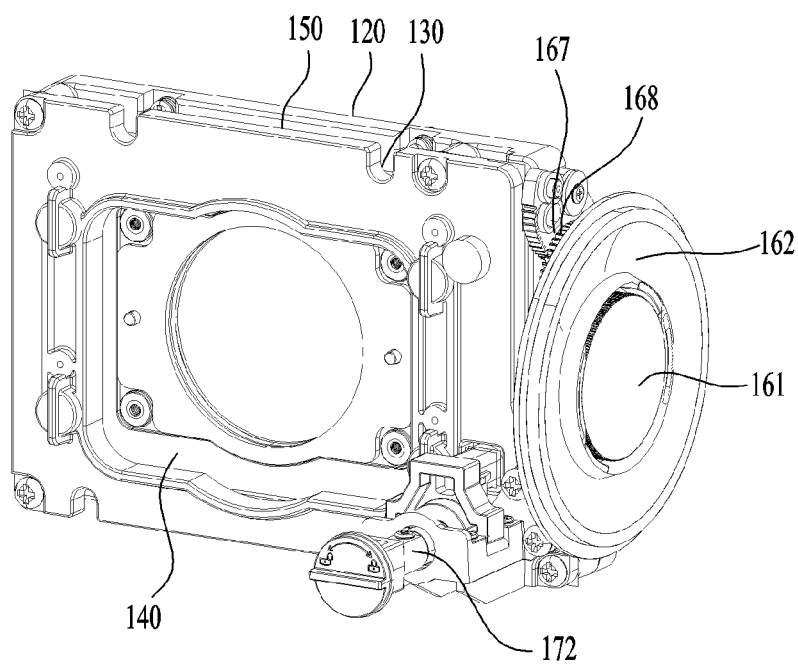
FIG. 14 is a diagram showing another embodiment of a position adjustment unit of a projector.

FIG. 14 is a diagram showing another embodiment of a position adjustment unit of a projector, and dials 161 and 162 and gears 167 and 168 may be located not at the top but in a lateral direction. If the gears 167 and 168 and the dials 161 and 162 are disposed in the lateral direction, thickness of the projector can be reduced, thereby enhancing portability and usability. In the present embodiment, the first direction and the second direction become the horizontal direction and the vertical direction, respectively.

As described above, the projector 100 of the present disclosure may implement the position adjustment unit 60 that moves in two directions with a single rotation axis, thereby reducing a volume of the position adjustment unit 60 advantageously.

Because the number of gears used for the position adjustment unit 60 can be reduced, it has low complexity, which can have quality advantages and price competitiveness.

In addition, disposition is facilitated in a manner of placing a dial position at the center of a projection lens, thereby eliminating the difficulty in placing two adjustment dials for left and right symmetry and providing a symmetrical appearance to provide design advantages.

It will be apparent to those skilled in the art that various modifications and variations can be made in the present disclosure without departing from the spirit or scope of the present disclosure.

The above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A projector, comprising:
   a housing;
   a projection unit projecting an image;
   a projection lens module enlarging and projecting the image projected from the projection unit to an external screen; and
   a position adjustment unit controlling positions of a first direction and a second direction of the projection lens module, the position adjustment unit comprising:
   a first fixed bracket fixed to the housing and including an opening perforated by the projection lens;
   a first movement bracket located on one side of the first fixed bracket and enclosing a circumference of the projection lens;
   a second movement bracket located on one side of the first movement bracket and enclosing the circumference of the projection lens;
   a screw fastened to the first movement bracket in the first direction;
   a first dial coupled to an end portion of the screw to be exposed externally;
   a second dial located on a circumference of the first dial in a ring shape; and
   a gear module moving the second movement bracket in the second direction on rotation of the second dial.

2. The projector of claim 1, wherein when the first dial rotates, the screw rotates and the first movement bracket including a helix groove engaging with a helix of the screw moves in the first direction.

3. The projector of claim 2, comprising:
   a first guide slot extended in the first direction; and
   a first guide projection,
   wherein the first guide slot and the first guide projection are located between the first movement bracket and the first fixed bracket and
   wherein a length of the first guide slot corresponds to a moving distance of the first guide bracket in the first direction.

4. The projector of claim 2, comprising:
   a second guide slot extended in the second direction; and
   a second guide projection,
   wherein the second guide slot and the second guide projection are located between the second movement bracket and the first movement bracket,
   wherein when the first movement bracket moves in the first direction, the second movement bracket moves in the first direction, and
   wherein when the second movement bracket moves in the second direction, the first movement bracket fails to move and the second guide projection moves in the second direction along the second guide slot.

5. The projector of claim 2, comprising:
   a ring-shaped bushing having the screw inserted therein;
   a leaf spring fixing the ring-shaped bushing to the first fixed bracket,
   wherein the ring-shaped bushing prevents the screw from moving in the first direction or the second direction.

6. The projector of claim 1, the gear module comprising:
   a dial gear formed on a circumference of the second dial; and
   a guide gear rotating in response to rotation of the dial gear and provided with a long hole in which a transfer pin of the second movement bracket is inserted.

7. The projector of claim 6, further comprising a center gear inserted between the dial gear and the guide gear, the center gear including a first gear engaging with the dial gear and a second gear engaging with the guide gear and disposed in a manner of overlapping with the first gear,
   wherein a diameter of the first gear is greater than that of the second gear.

8. The projector of claim 6, wherein the guide gear has a fan shape having a rotation shaft coupled to the first fixed bracket, wherein the long hole is extended from an end portion of the guide gear in a rotation axis direction, and wherein a length of the transfer pin is greater than a moving distance of the first movement bracket in the first direction.

9. The projector of claim 1, wherein the projection lens module is fixed to the second movement bracket and wherein an opening of the first movement bracket is greater than a size of the projection lens module in the second direction by at least a moving distance of the second movement bracket in the second direction.

10. The projector of claim 1, further comprising a second fixed bracket located on one side of the second movement bracket and fastened to the first fixed bracket.

11. The projector of claim 10, further comprising a leaf spring located between the second fixed bracket and the second movement bracket so as to pressurize the second movement bracket and the first movement bracket in a direction of the first fixed bracket.

12. The projector of claim 10, comprising:
    a fixed pin having one end touching the second movement bracket by perforating the second fixed bracket;
    a helix formed on an outer circumference of the fixed pin; and
    a third dial coupled to the other end of the fixed pin and exposed externally,
    wherein if the third dial rotates, the fixed pin pressurizes the second movement bracket in a direction of the first fixed bracket.

13. The projector of claim 10, comprising:
    a fixed pin including a helix formed on an outer circumference;
    a fixture including a screw hole having a helix groove formed to engage with the helix of the fixed pin and touching the second movement bracket by perforating the second fixed bracket; and
    a third dial coupled to the other end of the fixed pin and exposed externally,
    wherein if the third dial rotates, the fixed pin pressurizes the second movement bracket in a direction of the first fixed bracket.

14. The projector of claim 1, the first dial, comprising:
    an outer dial of a disc type exposed externally and having a first torque limiter prominence and depression formed on an inner lateral side; and
    an inner dial having the screw fastened thereto,
    wherein a second torque limiter fastened by engaging with the first torque limiter is formed on a surface of the inner dial confronting the outer dial,
    wherein in a movable range of the first movement bracket, the first torque limiter and the second torque limiter maintain to engage with each other and the outer dial and the inner dial rotate together, and
    wherein if a movement limit position of the first movement bracket is reached, when the outer dial rotates, the inner dial is fixed and a fastened state of the first and second torque limiters changes.

15. The projector of claim 14, further comprising an elastic fixed part applying elasticity to the inner dial to enable the inner dial to adhere closely in a direction of the outer dial.

* * * * *